United States Patent [19]
Bennett et al.

[11] Patent Number: 5,949,952
[45] Date of Patent: *Sep. 7, 1999

[54] AUDIO AND VIDEO TRANSCRIPTION SYSTEM FOR MANIPULATING REAL-TIME TESTIMONY

[75] Inventors: James D. Bennett, Chicago; Lawrence M. Jarvis, Wheaton, both of Ill.

[73] Assignee: Engate Incorporated, Wheaton, Ill.

[ * ] Notice: This patent is subject to a terminal disclaimer.

[21] Appl. No.: 08/818,402

[22] Filed: Mar. 12, 1997

Related U.S. Application Data

[63] Continuation of application No. 08/066,948, May 24, 1993, Pat. No. 5,878,186, which is a continuation-in-part of application No. 08/036,488, Mar. 24, 1993, Pat. No. 5,369,704.

[51] Int. Cl.⁶ ........................................................ H04N 5/91
[52] U.S. Cl. ................................ 386/46; 386/69; 348/61; 380/9
[58] Field of Search ........................... 348/61, 232, 515; 360/13, 79, 4, 72.1, 72.2; 704/8, 235; 386/46, 69; 380/9

[56] References Cited

U.S. PATENT DOCUMENTS

| | | | |
|---|---|---|---|
| 3,798,387 | 3/1974 | Gallagher, Jr. | 360/79 |
| 3,879,751 | 4/1975 | Gimelli | 360/13 |
| 4,641,203 | 2/1987 | Miller | 386/95 |
| 4,864,501 | 9/1989 | Kucera et al. | 364/419 |
| 4,924,387 | 5/1990 | Jeppesen | 364/409 |
| 4,965,819 | 10/1990 | Kannes | 348/15 |
| 5,031,113 | 7/1991 | Hollerbauer | 364/513.5 |
| 5,127,003 | 6/1992 | Doll, Jr. et al. | 370/110.1 |
| 5,172,281 | 12/1992 | Ardis et al. | 360/72.2 |
| 5,272,571 | 12/1993 | Henderson et al. | 360/4 |
| 5,280,430 | 1/1994 | Woods et al. | 364/419 |
| 5,369,704 | 11/1994 | Bennett et al. | 380/9 |
| 5,613,032 | 3/1997 | Cruz et al. | 386/69 |

Primary Examiner—Andrew L. Sniezek
Attorney, Agent, or Firm—Engate Incorporated

[57] ABSTRACT

A transcription network having linked computer terminals for a court reporter and for examining, defending, and associate attorneys is disclosed. Based on the hardware present, the court reporter terminal automatically selects the most appropriate synchronization and audio and video transcript delivery schemes for the other terminals. A multimode synchronization scheme provides for various levels of synchronization of the textual transcript with the audio and video transcripts of the proceeding. A first-in first-out arrangement is provided for controlling the video and audio storage space so that a window of available audio and video can be specifically marked and retrieved for post-proceeding review.

39 Claims, 7 Drawing Sheets

TRANSCRIBED TEXT TIME FRAME RECORD — 901

- 903: Q or A number
- 905: beginning_transition_marker
- 907: ending_transition_marker
- 909: computed_beginning_marker
- 911: computed_ending_marker
- 913: selected_beginning_marker
- 915: selected_ending_marker

AUDIO AND VIDEO TRANSCRIPTION SYSTEM FOR MANIPULATING REAL-TIME TESTIMONY

This application is a continuation of U.S. application Ser. No. 08/066,948 filed May 24, 1993, now U.S. Pat. No. 5,878,186, which is a continuation-in-part of U.S. application Ser. No. 08/036,488 filed Mar. 24, 1993, now U.S. Pat. No. 5,369,704.

INCORPORATION BY REFERENCE

The descriptive matter of the above-referred to pending U.S. application Ser. No. 08/036,488, filed Mar. 24, 1993, by Bennett et al. (Attorney Docket No. P93-00), now U.S. Pat. No. 5,369,704, is incorporated herein by reference in its entirety, and is made part of this application.

BACKGROUND OF THE INVENTION

This invention relates to a down-line transcription system used by attorneys for reviewing real-time transcription during a proceeding such as a trial or deposition; and more particularly, to a method and apparatus for providing real-time use and manipulation of audio and video transcripts by attorneys, judges, court reporters, witnesses and clients.

As is well known, legal proceedings such as a deposition or trial involve the participation of, among others, an examining attorney who asks questions and a witness who must answer ("testify") while under oath. These answers ("testimony") are recorded by the court reporter, along with the associated questions and related conversation, using a stenographic recorder. A stenographic recorder is a machine which provides a set of keys which are stroked by the court reporter in various combinations and sequences to represent a spoken word. To provide a backup to the key-strokes, court reporters use a tape recorder to record the entire proceeding.

Newer versions of stenographic recorders have been developed and linked to computer aided transcription ("CAT") systems to help automate the manual transcription process. Instead of solely using paper tape recording methods, the stenographic recorder also electronically stores key-strokes in built-in memory or on disk. After using such a newer recorder, the court reporter returns to his office and transfers the electronically stored key-strokes to his CAT system for transcription. Although the bulk of electronically stored key-strokes may be translated automatically, the court reporter still works interactively with the CAT system to translate those key-strokes which the CAT system did not recognize.

For the transcription system mentioned above, court reporters often use the tape recorder to aid in translating untranscribed key-strokes. In a manual process, the court reporter repeatedly searches forward and backward and listens to the tape to identify the section of the tape that corresponds to the untranscribed key-stroke(s). In locating the corresponding audio, the court reporter wastes a great deal of time.

In addition to transcribing the proceeding using automatic, post-processed transcription and audio taping, a court reporter may use a video recorder to record the entire proceeding for a similar purpose. In addition to aiding transcription, video or audio recording of a proceeding provides other advantages. For example, during a trial, an attorney often admits into evidence testimony from a prior proceeding, such as a deposition. This is normally done by reading the desired portion of the written deposition transcript into the trial record. However, there are times when this process may become tiresome and cause the jury to lose interest. To keep the jury interested, an attorney may instead want to play the actual video or audio of the desired testimony.

Video or audio recordings of prior testimony also offer other benefits at trial. Unlike a written transcript, video or audio enable an attorney to convey to the jury the demeanor of the witness. For example, if a witness hesitates before answering a deposition question and is then visibly and audibly uncomfortable in answering, the jury may question the witness's credibility. It is virtually impossible to convey the same to the jury from prior written testimony.

In addition, an attorney may want to play video or audio of prior testimony by a trial witness to ask the witness to clarify the prior testimony in view of his present testimony or to impeach the witness.

Despite the desirability of video or audio recordings, their use in court proceedings has been very limited due to various problems. For example, if an attorney wants to use prior video or audio testimony at trial, he must, as part of pre-trial preparation, consult the written transcript and then manually search through any number of tapes to find the desired material. The attorney may also want to edit out any undesired material. Most attorneys, however, do not have the equipment or time (especially immediately prior to or during a trial) to perform these tasks. Consequently, an attorney often must send the tapes to an editing company, or court reporter, that specializes in video and audio editing. Besides being time consuming, this alternative process is also expensive and forces the attorney to rely on the accuracy and dependability of the editing company or court reporter. Mistakes often occur that are not discovered until trial when it is too late.

In addition, video and audio recordings present problems associated with storing, accessing, and annotating a large volume of material. An attorney at trial normally must sift through many hours of testimony including that from numerous depositions, previous trial testimony, and possibly from a preliminary injunction or other hearing. All this testimony must be stored on tapes, creating the problem of accessing desired testimony at the desired time. The trial process is often unpredictable and an attorney cannot have video or audio testimony prepared for all possible contingencies or potential uses.

Furthermore, even if an attorney could have prior testimony prepared for use at any given time during the trial, he is still unable to access previous video or audio trial testimony given the same day. Say, for example, an attorney wants to revisit testimony given a half hour earlier. To do so would require the court reporter to stop taping and manually rewind to find the desired testimony and eventually fast forward to reset the tape in order to continue the proceeding. Because it is time consuming and burdensome, this process is not practicable in a fast paced trial setting.

If, for example, an attorney does not understand an answer, the video and audio taping proceeds while the court reporter reads the answer back from the paper tape record. This requires the court reporter to stop recording, pick up the paper tape output from the stenographic recorder, search for the portion of the record at issue, and read the stenographic key strokes. This reading is often broken with misplaced delays in pronunciation between phonemes and words making it difficult to understand. Furthermore, because searching for a portion of the record in a series of printed key-strokes proves to be very difficult and time consuming, attorneys are forced to limit requests to have only the most recent Q & A's read back.

It is therefore an object of the present invention to provide a method and apparatus which will provide real-time synchronization of a written transcript with audio and video.

It is a further object of the present invention to provide a method and apparatus which will provide virtual real-time access to prior audio or video testimony.

Yet another object of the present invention is to provide a method and apparatus which will provide virtual real-time marking and annotation of audio or video.

SUMMARY OF THE INVENTION

These and other objects of the present invention are achieved in a transcription network having a terminal that transcribes signals representative of spoken words into corresponding alphabetic and numeric text. The terminal is linked to a tape recorder and, via the link, creates associations between recorded spoken words and the corresponding alphabetic and numeric text. Analysis is provided to synchronize the associations created by the terminal.

Other objects are achieved in a transcription system having a terminal that selectively plays back spoken words recorded on the tape recorder using the synchronized associations. The terminal also provides a digital synchronization signal using the tape recorder. In addition, the terminal provides an audible synchronization signal using the tape recorder.

Other objects are also achieved in a transcription system having a video camera for recording a proceeding. A means is provided for synchronizing the visual recording by creating associations with the corresponding signals representative of spoken words.

Other objects and further aspects of the present invention will become apparent in view of the following detailed description and claims with reference to the accompanying drawings.

BRIEF DESCRIPTION OF THE DRAWINGS

FIG. 3 is a timing diagram illustrating the functionality of speaker detection synchronization of the present invention for automatically providing an additional level of synchronization of the textual, audio and video transcripts.

DESCRIPTION OF THE PREFERRED EMBODIMENT

Figure 1:
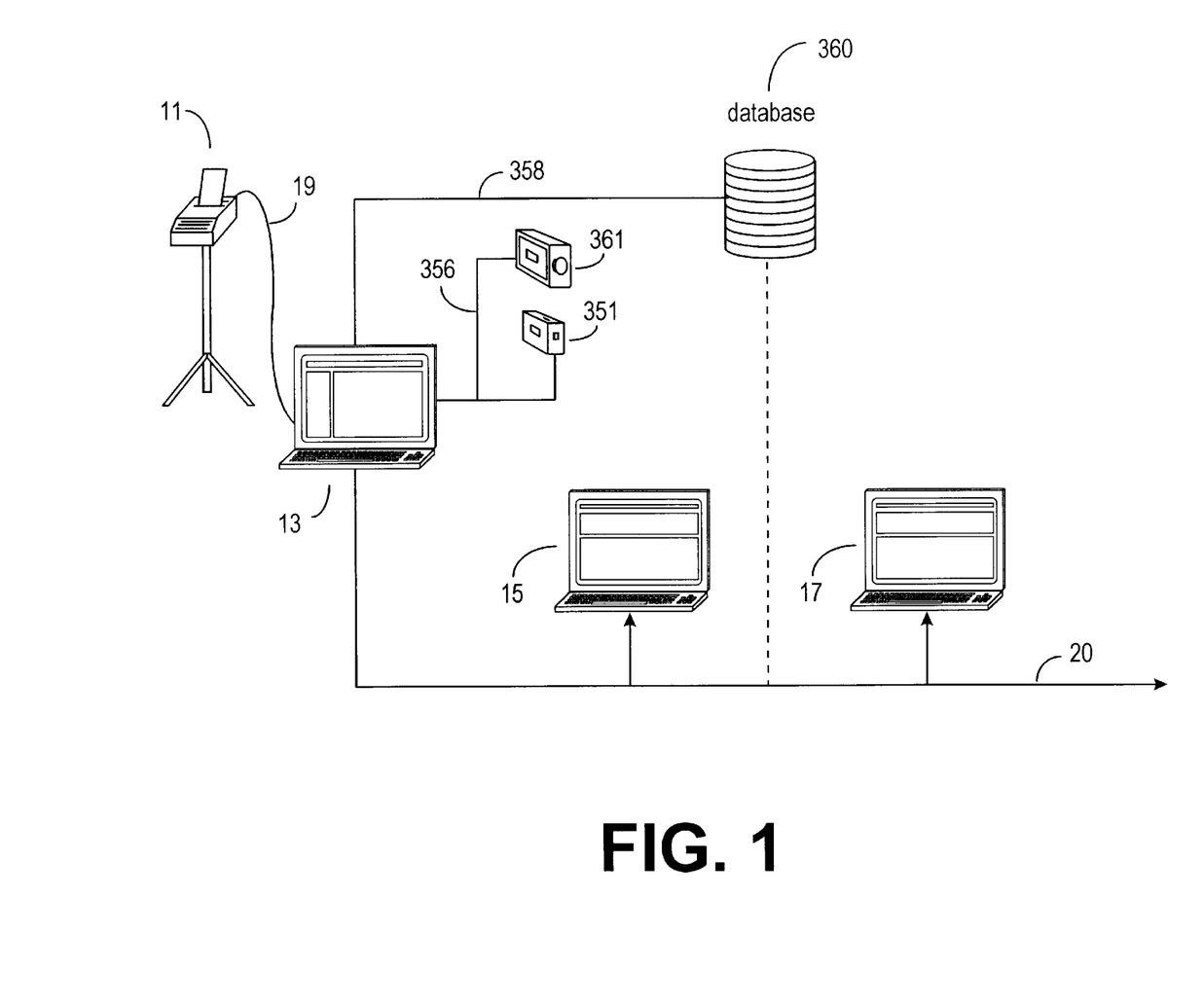
FIG. 1 is a perspective view of an embodiment of an overall transcription system according to the present invention for providing a first level of synchronization of textual, audio and video transcripts.

FIG. 1 illustrates an embodiment of an overall audio and video synchronization system configuration according to the present invention. A stenographic recorder 11 is used by a court reporter at a deposition, hearing or other transcription proceeding to record digital coded signals representative of verbal communications as they are spoken. Using a communication link 19, the stenographic recorder 11 transfers the representative signals to a computer aided transcription ("CAT") system 13, a computer terminal used by the court reporter, for automated transcription. In virtual real-time, the CAT system 13 produces a textual record of the proceeding which corresponds to the actual words spoken.

Although an independent stenographic recorder 11 is illustrated, the functionality of the recorder 11 may be directly added to the CAT system 13. Similarly, instead of using stenographic keystroking as the vehicle for recording the proceeding, the present invention also contemplates the use of voice or shorthand recording and transcription methods to create the textual record (the "textual transcript").

A video camera 361 and/or a tape recorder 351 may also be used to create video and audio records (the "audio and video transcripts") of the proceeding. The court reporter always utilizes the audio record for completing the automated transcription process, i.e., to manually transcribe words that the CAT system 13 fails to transcribe. If the video camera 361 provides for audio recording, the independent tape recorder 351 is not necessary. Similarly, often times video taping is not required. In such circumstances, only the tape recorder 351 is used. Moreover, in some modes of operation, where the full storage of the audio and video occurs via the database 360, the camera 361 and recorder 351 may be used only as a backup, or may be completely replaced by video and audio pick-up devices having no taping capabilities.

The CAT system 13 stores the textual transcript in a database 360 via communication link 358. As described in detail below, the CAT system 13 also stores synchronization information in the database 360. Additionally, depending on the mode of operation, the database 360 may also be used to store all or portions of the audio and/or video transcripts. The database 360 may be local (i.e., within the CAT system 13 itself, or otherwise), remote, or be distributed between the two (i.e., part local and part remote).

The CAT system 13 also communicates the textual transcript as it is created (in "real-time") along a communication link 20 to a variety of remote or local terminals, such as attorney terminals 15 and 17, for review. Depending on the mode of operation, the audio and video transcripts or portions thereof are also made available to the terminals 15–17 for real-time and/or post-proceeding review.

Specifically, during the proceeding, the court reporter produces a keystroke, or a series of keystrokes, to indicate a change in speakers. Hereinafter, such keystroke(s) are referred to as a "transition marker". The CAT system 13 uses transition markers to separate portions of the textual record as originating from the appropriate speaker. For example, one transition marker indicates that a following portion of text originated from the witness and should thus be considered an answer. Similarly, another transition marker indicates that a subsequent portion of text, a question, originated from the examining attorney. However, the transition markers only separate text, not the corresponding actual audio or video. Hereinafter, the portion of the audio and video transcript corresponding to a single question, answer, etc., will be referred to as a "unit of speech".

Although they provide a relatively close estimate, the transition markers do not appropriately identify units of speech due to inherent synchronization in the textual transcription process. In particular, a transition marker provides only a rough estimate of the time at which a unit of speech begins and ends. For example, typically, the court reporter finishes recording a unit of speech, and may wait during several minutes of silence (the "sound gap") before being sure in that unit of speech has been completed. Either the same speaker could continue the unit of speech ending the sound gap, or an alternate speaker could begin an new unit of speech indicating a need for a transition marker. In the latter instance, upon hearing the alternate speaker, the court reporter responds to enter the transition marker. However, the court reporter's response is not instantaneous. Therefore, in such instances, the received transition marker provides a delayed indication of the beginning of the new unit of speech, and a very late indication of the end of the previous unit of speech.

Other situations provide for further synchronization of the transition markers. For example, the court reporter may be forced to provide a transition marker well after the actual transition because of either speaker overlap (two persons talking at the same time), or due to the court reporter's falling behind. In either situation, the actual end and beginning transitions cannot be identified using the court reporter's transition markers. Without actual beginning and ending transitions, units of speech in the corresponding audio and video transcripts cannot be fully synchronized with the textual transcript. Full synchronization is accomplished in a variety of ways with the present invention, as described in more detail below with regards to FIG. 2.

The CAT system 13 stores each textual counterpart to a unit of speech as a programming object in the database 360. As each new unit of speech is transcribed, the CAT system 13 creates a new object and stores it in sequential order in the database 360. In addition, upon receiving a beginning transition marker from the stenographic recorder 11, the CAT system 13 retrieves information regarding the current tape position of both the tape recorder 351 and the video camera 361, and stores it in the object representing the unit of speech. When the ending transition marker is received, the CAT system 13 again retrieves and stores the current tape positions with the object. Thus, the series of objects provides an association constituting a first level of synchronization of the textual transcript with the audio and video transcripts.

Although additional levels of synchronization may be implemented, with the CAT system 13 can be used to play back only the portions of audio and video which correspond to the textual counterpart to a selected unit, or several units, of speech. Basically, if the court reporter desires to replay the audio and video for a specific question and answer, upon locating the text of the question and answer, the CAT system 13 locates the corresponding audio and/or video using the programming object for replay. Although this process may occur manually, preferably, the CAT system 13 automatically locates and replays the audio and video via control through the link 356, or via the database 360 if the desired audio and video is stored there.

Tape positions are received directly from the tape recorder 351 and the video camera 361 via the link 356. In the alternative, it is also contemplated that the CAT system 13 might send a signal representing an upcoming Q & A number to the recorder 351 for recording. This signal may be either a voice-synthesized indication of the unit of speech sequence number aiding manual searching, or a digital data stream that is detectable using the recorder 351 during low or high speed searching directed via the CAT system 13.

Upon a request from a judge or attorney to read back a Q & A, the court reporter may play back the associated audio and video by merely locating the requested Q & A on reporter terminal 13, by stepping back through the Q & A's or through a lexical search, and selecting a play-back command. With synchronization, the court reporter can avoid the clumsy and time consuming searching through the audio and videotape to locate Q & A's. In other words, the court reporter can quickly and easily locate desired audio and video on the respective tapes.

In the illustrated configuration, the terminals such as the terminals 15 and 17 provide opportunities for attorneys to freely mark and annotate the textual, audio, and video transcripts during and/or after the proceeding. Further detail regarding the marking and annotating of desired testimony through the attorney terminals 15–17 can be found in the pending parent U.S. application Ser. No. 08/036,488, filed Mar. 24, 1993, which is incorporated herein by reference.

Figure 2:
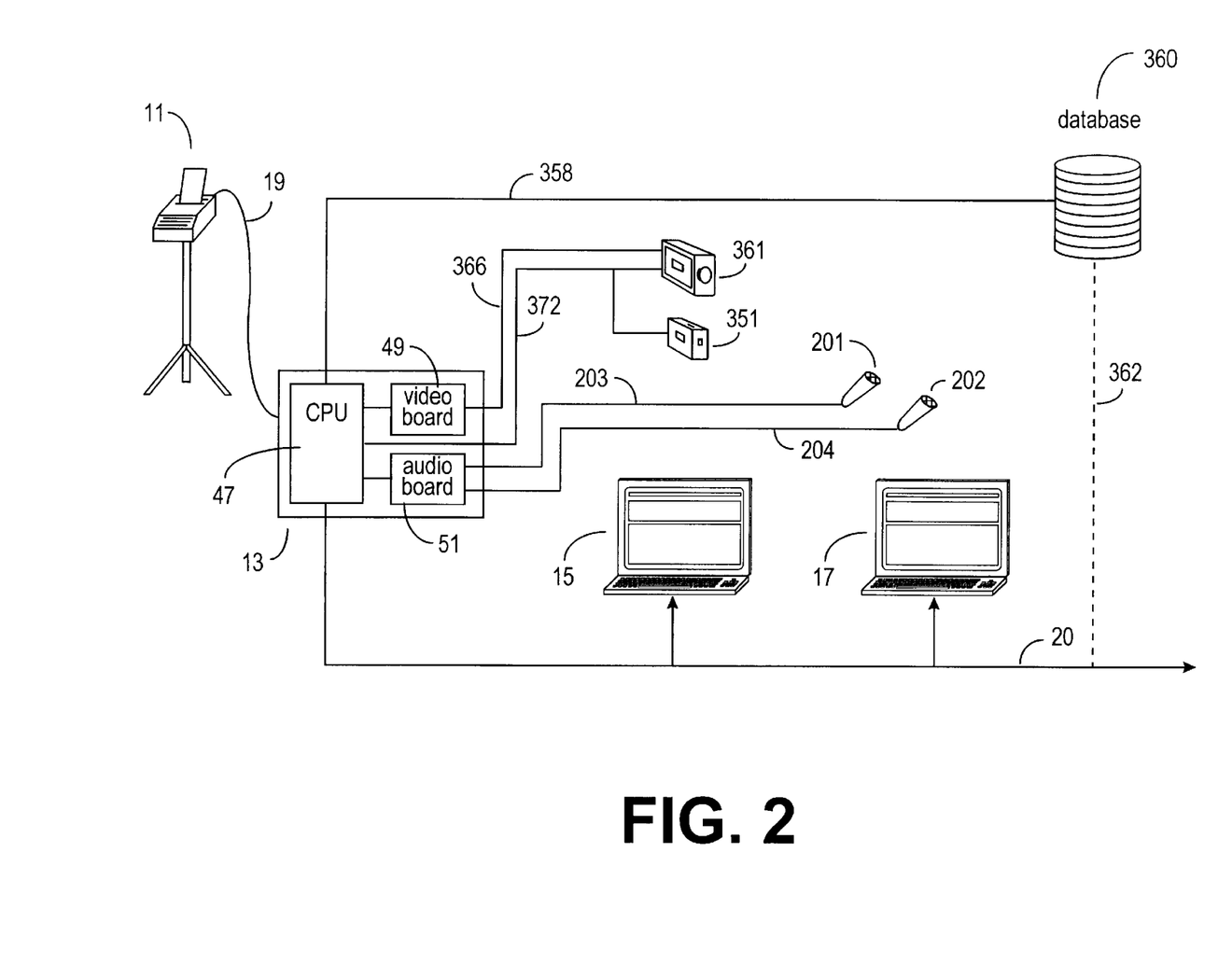
FIG. 2 is a perspective view of an embodiment of an audio and video synchronization system according to the present invention which illustrates selectable multi-mode operation.

FIG. 2 illustrates another embodiment of the present invention which provides multiple modes of operation for performing further levels of synchronization of the textual, audio and video transcripts. In this embodiment, the CAT system 13 may include video and sound processing boards 49 and 51, respectively. Also within the CAT system 13, a CPU (Central Processing Unit) 47 detects the presence or absence of the processing boards 49 and 51, and, based thereon, offers one or more modes of synchronization functionality to the court reporter. If, for example, the absence of the audio and video boards 51 and 49 is detected, the CAT system 13 automatically selects a first or minimally functional mode for performing synchronization. This mode is described in detail with regards to FIG. 1.

Where at least the audio processing board 51 is present, the CAT system 13 offers the court reporter two additional modes of operation. First, a space saving mode can be selected. In the space saving mode, the CPU 47 uses the audio board 51 only for synchronization purposes, and not for sound reproduction. Without providing for sound reproduction, the storage space on the database 360 can be conserved. While in the saving mode, the CPU 47 ignores the video board 49 whether installed or not. Second, a fully functional mode may also be selected. In this mode, the CAT system 13 analyzes the space available on the database 360 and suggests an allocation of storage space for providing audio (and possibly video) synchronization and reproduction. The suggested storage space allocation may be accepted or reduced as may be desired.

More specifically, in the minimal functionality mode, the CPU 47 manages marking of the audio and video via a control link 372. As described in detail regarding FIG. 1, the CPU 47 of the reporter terminal 13 provides for synchronization through the sequence of unit of speech objects stored in the database 360. These objects provide direct synchronization between the court reporter's transition markers and the corresponding tape positions of the camera 361 and recorder 351. Although this mode of synchronization only provides the court reporter with a good starting point, local manual searching can provide for identification of the actual transitions.

To aid manual searching for actual transitions, the CAT system 13 sequentially steps through each unit of speech in the textual transcript and provides the court reporter with an interactive opportunity to search for actual transitions. In particular, the CAT system 13: 1) displays a unit of speech; 2) locates the corresponding tape positions from the programming object; 3) controls the positioning of the tape recorder 351 and video camera 361 to a position about three (3) seconds before the located tape positions indicate; 4) begins to play the tapes (while providing fast-forward, rewind, pause, etc., and other typical audio and video reviewing commands; and 5) awaits the court reporter's selection of the actual transition mark. As each actual transition mark is selected, the CAT system 13 adds the actual transition marks (i.e., the newly retrieved tape positions) to the corresponding programming object. Afterwards, during review periods, the CAT system 13 utilizes the actual transition marks to fully synchronize the audio and video transcript with the textual transcript.

To aid in the synchronization process associated with the first mode of operation, the CAT system 13 uses a default setting to offset the court reporter's transition markers to help minimize the amount of manual interaction that is needed to identify the exact transition points. Specifically, instead of using a court reporter's transition marker as a starting point of a unit of speech, the transition marker is offset by a maximum reporter reaction time. Upon playback, instead of always having to rewind to find the beginning of a unit of speech, the offset generally provides a sufficient header to the transition marker to capture the beginning of a unit of speech. Rewinding and often times exact transition identification becomes unnecessary. Detail regarding this offsetting is provided below in regards to FIG. 3.

In the saving mode, the audio board 51 is used to aid in automatically providing a more exact synchronization of the video, audio and textual transcripts. In this mode, the CPU 47 uses the audio board 51 to provide digital samples of the audio signals representing the words being spoken. The CAT system 13 analyzes the audio samples in a variety of ways to identify the actual timing of the units of speech. Based on the identified timing, the tape positions associated with each unit of speech is adjusted and stored in the corresponding programming object. Thereafter, the CAT system 13 utilizes the adjusted tape positions to provide for play-back synchronization of the audio and video transcripts per any given unit of speech recorded in the textual transcript. Additionally, although not usually necessary, the court reporter may interactively override the automatically adjusted tape positions with actual transition marks as described above.

Particularly, among other circuitry, the audio board 51 contains an analog to digital (A-D) converter which preferably operates on analog audio signals from both a left and right microphone 201 and 202 via respective links 203 and 204. A single microphone or an audio-tape from the recorder 351 might alternately be used with lesser synchronization functionality as will become apparent. The left microphone 201 is physically positioned near or on the witness, while the right microphone 202 is located near or on the examining attorney.

The audio board 51 digitally samples the audio signals generated by the left and right microphones 201 and 202. By comparing and analyzing the resultant samples, the CAT system 13 identifies more exact timing (i.e., synchronization) for the units of speech. Specifically, by comparing the amplitude of left and right samples, the CAT system 13 determines which speaker is speaking and when each unit of speech takes place. This determination provides the CAT system 13 with sufficient information to provide for a more exact synchronization of the audio and video transcripts with the textual transcript.

Where only a single audio pick-up is used, such as a single microphone or the recorder 351, the CAT system 13 analyzes the samples to identify sound gaps (or "dead zones") between one speaker and the next. The beginning and ending of the dead zones indicate when each unit of speech takes place. Based on the indications, the CAT system 13 also provides a more exact synchronization of textual, audio and video transcripts.

Synchronization based on the analysis of the differential signal and the dead zone are described in more detail below.

Because the audio samples in the space saving mode are only used to aid in the synchronization of the units of speech, a sampling rate of only about ten hertz (10 Hz) with eight (8) bit resolution is needed. Numerous companies provide suitable audio boards, such as, for example, Creative Labs of Santa Clara, Calif. However, for this mode, only a very basic dual-channel, eight (8) bit A/D converter board is needed.

In the fully functional mode, the terminal 13 not only provides the functionality described in the saving mode, but also provides real-time digital audio and video to the terminals 15 and 17. If storage space in the database 360 permits, the audio and video taping by the camera 361 and the recorder 351 would be unnecessary. However, as illustrated, taping is preferred not only as a backup, but also where the database 360 cannot provide for complete storage of the audio and video of the entire proceeding.

The audio board 51 accepts audio signal input from either the microphones. 201 and 202, from a single microphone (not shown), or directly from the audio tape recorder 351 (not shown). Because the human voice ranges from about 300 to 3000 Hz, to provide the speech reproduction quality of about that offered by a telephone network, an eight (8) bit sampling rate of 8000 Hz is chosen. A higher sampling rate or bit resolution may be selected upon setup configuration for better sound reproduction at the expense of storage space. For synchronization purposes, however, the CAT system 13 only considers one (1) out of every eight hundred (800) of these samples, although various averaging schemes might also be used.

The video processing board 49 accepts video signals from video camera 361 along the link 366. The video board 49 samples the incoming video signals into discrete video frames. The sampling occurs at a high enough rate (at least 24 frames per second, preferably 30) so that when played back, the video appears completely animated to the human eye. Numerous companies provide video processing boards for performing such functionality, as for example, the Intel Corporation's Indeo® video recorder board.

Upon receiving a transition marker, the CPU 47 obtains pointers to: 1) the current frame generated by the video processing board 49; and 2) the current sample generated by the audio processing board 51. The CPU 47 associates the pointers with the transition marker in the programming objects for the previous and the new units of speech. In the previous unit of speech, the association provides an indication of the end of the previous unit of speech. In the new unit of speech, the association indicates the beginning of the new unit of speech. Further levels of synchronization occur in a similar way as with the space saving mode.

All of the audio and video samples are then stored, via the link 358, in the database 360. However, if the storage space taken up by the samples reaches the storage space allocation (configured upon setup as described above), the CAT system 13 begins to treat the database 360 allocation as a FIFO (first in first out device) so as not to exceed the allocated storage space. In effect, where the video and audio samples exceeds the storage space allocation, the database 360 acts as a window of opportunity for instant access to the samples.

The attorney terminals 15 and 17 may independently store all of the audio and video samples generated if local memory permits. However, because a majority of a deposition or trial testimony has little value, the attorneys using the terminals 15 and 17 are more likely to only want to store the important audio and video it for review and annotation. To do this, upon identifying an important series of units of speech, attorneys merely select the units of speech and request audio and/or video via an attorney terminal, such as terminals 15 and 17. The audio and video samples are extracted from the database 360 either directly via the link 362 or indirectly via the CAT system 13 acting as a file server. The requesting attorney terminal stores the extracted samples, and associates them with the textual transcript. The extraction process may occur during and after the proceeding.

If the space allocation does not permit full storage of the samples in the database 360, the attorneys can only access the most recent window of audio and video. Typically, a window of opportunity lasting about an hour proves sufficient for such marking, because attorneys identify most important questions and answers usually within minutes of their occurrence.

Figure 3:
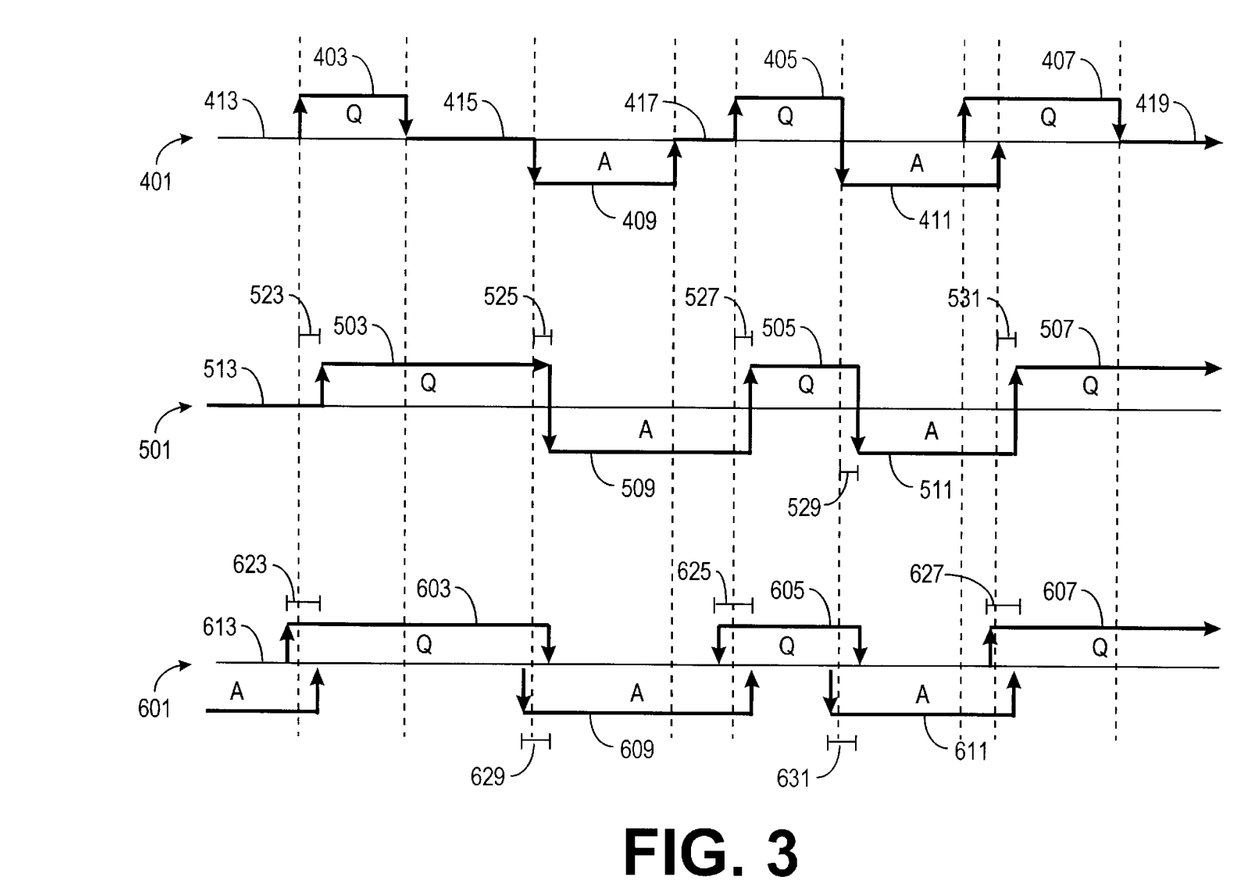
FIG. 3 is a timing diagram illustrating the functionality of default synchronization of the present invention for automatically providing a second level of synchronization of the textual, audio and video transcripts.

As illustrated in FIG. 3, in the minimal functionality mode, an offset feature is provided for aiding in the synchronization process. FIG. 3 is a timing diagram which represents an exemplary question and answer interchange between an attorney and a witness in the minimal functionality mode of operation. Specifically, a time line 401 illustrates an exemplary window in time of the taking of testimony in a proceeding. Time periods 403, 405, 407 represent units of speech during which the attorney asks questions. Similarly, time periods 409 and 411 represent units of speech during which the witness is testifying (i.e., answering the questions). Time periods 413, 415, 417 and 419 represent sound gaps or "dead zones" between question and answer units of speech during which no one is talking. While dead zones are the normal transition between questions and answers, there may also be other transition situations. For example, at the trailing end of question 405, there is a simultaneous transition to answer 411 (i.e., where the witness begins testifying immediately at the end of the question). Overlap of question and answer units of speech may also occur, as is shown with respect to the transition between answer 411 and question 407. Overlap occurs where two speakers talk at the same time.

A time line 501 illustrates the court reporter's keystroke recording of the units of speech of the time line 401. Arrowheads indicate the receipt of transition markers. Time periods 523, 525 and 527 represent the court reporter's reaction time delay. Time period 529 represents a delay due to the court reporter's falling behind. Time period 531 represents a delay caused by the overlapping speakers.

More specifically, the court reporter responds to the question 403 after the reaction time 523 with a transition marker indicated by the upward pointing arrowhead. Thereafter, the court reporter completes the keystroking of the question 403 and waits for the next unit of speech, both during a time period 503. At the beginning of the answer 409, the court reporter responds some reaction time 525 later with a transition marker indicated by the downward pointing arrowhead. The court reporter then strokes the answer 409 and again awaits a new unit of speech, both during a time period 509. This process illustrates the ordinary interaction of the attorney and the witness, providing insight into the core synchronization problems due to: 1) the court reporter's reaction time; and 2) the failure to mark the actual end of a unit of speech.

In addition, upon hearing the beginning of the question 405, the reporter reacts after the time period 527 and begins to keystroke the question 405 during a time period 505. However, the court reporter is unable to finish stroking the question 405, before the witness begins the answer 411. The court reporter finishes the question 405 some variable time period, the time period 529, after the answer 411 has begun. The court reporter registers a transition marker and begins stroking the answer during a period 511.

To complicate matters, the attorney begins the question 407 while the witness is still finishing the answer 411. Again, at some time after the overlap, the court reporter finishes the answer 411 and begins the question 407 during a period 507. As can be appreciated, the court reporter's own keystroking delay time causes an offset from the true speaker transition points in cases such as between the question 405 and the answer 411 or the overlapping regions, such as between the answer 411 and the question 407.

In the minimal functionality mode, if the CAT system 13 uses the actual transition markers to provide an indication of the beginning of a unit of speech, it can be appreciated that upon play-back the beginning of each unit of speech will be missed. Rewinding will always have to occur. In anticipation of this problem, a time line 601 illustrates how an offset is used to minimize having to rewinding. Particularly, a standard offset value of about three (3) seconds is subtracted from the transition markers when determining the beginning of a unit of speech. As illustrated, offsets 623, 625 and 627 help ensure that the beginning of the questions 403, 405 and 407 are not be missed. However, in circumstances where overlap continues for a period longer than the offset, such as between the answer 411 and the question 407, rewinding will still be required. In most instances however, the offset provides the court reporter with a sufficient lead time to capture the beginning of most units of speech without rewinding.

Figure 4:
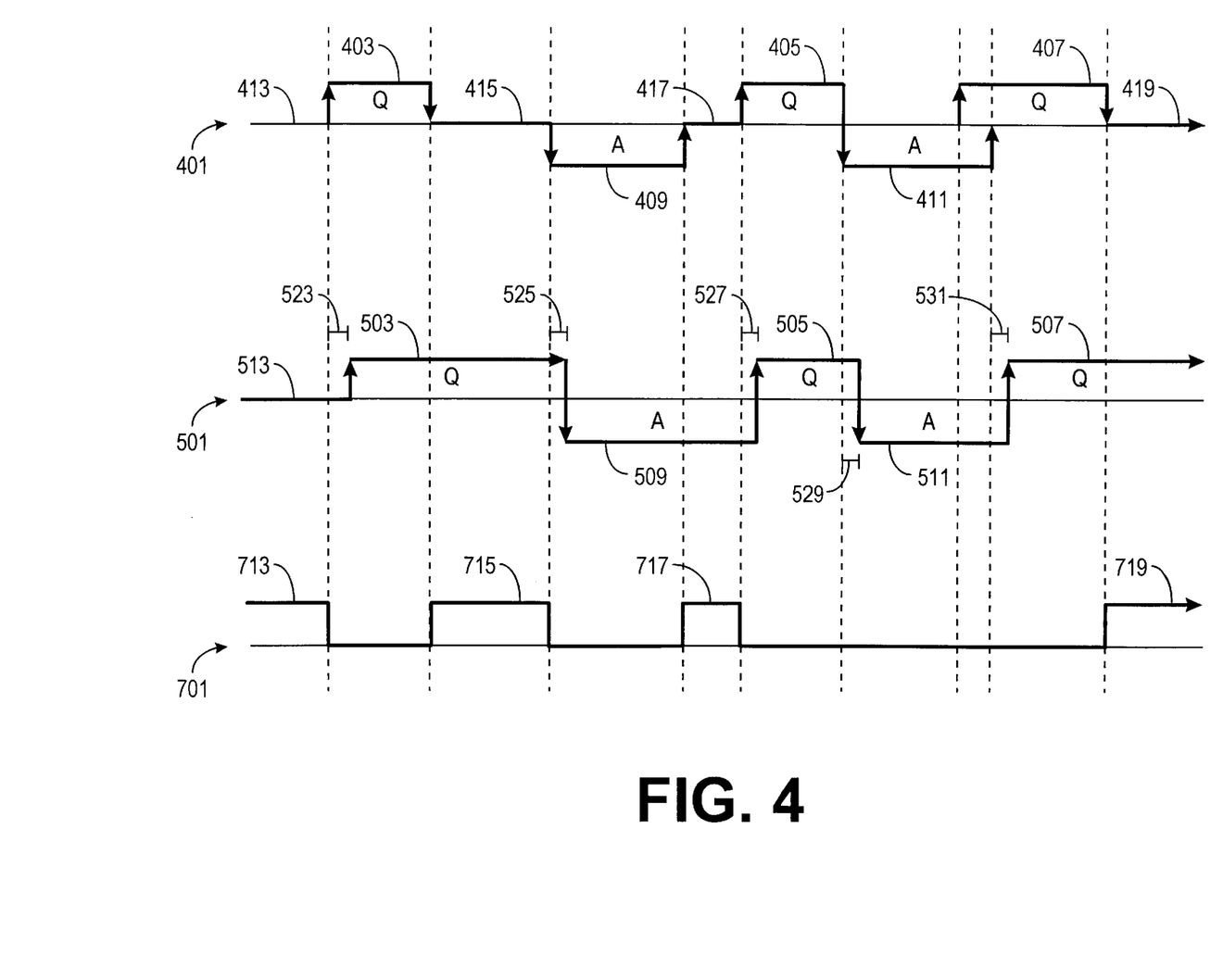
FIG. 4 is a timing diagram illustrating the functionality of dead zone synchronization of the present invention for automatically providing an additional level of synchronization of the textual, audio and video transcripts.

FIG. 4 is a timing diagram of the dead zone synchronization scheme of the present invention. The time lines 401 and 501 are identical to that found and described in regards to FIG. 3. They are duplicated to provide time referencing with the dead zone timing of a time line 701. By identifying the beginning and ending of dead zones, the CAT system 13 can automatically identify appropriate beginnings and endings for most all units of speech recorded during the proceeding. In fact, if no speaker overlap exists, exact synchronization is possible for all recorded units of speech. For overlapping situations without dead zones, the CAT system 13 reverts to the default offset to help identify an appropriate, although not exact, beginning as described in detail above with regards to FIG. 3.

The CAT system 13 performs dead zone synchronization by first identifying the dead zones. This is accomplished by: (1) continuously computing the average value of the noise level during each unit of speech recorded; (2) using the average value to compute a threshold value below which noise is considered ambient; and (3) checking the noise level during a window of time before each of the court reporter's transition markers to locate the dead zones, i.e., a period of time during which the noise level is below the threshold value.

The end of each dead zone provides a beginning marker for the beginning of a new unit of speech. Similarly, the beginning of each dead zone provides an ending marker for the end of the previous unit of speech. A lead-in time period is subtracted from the beginning markers, while a trailer time period is added to all ending markers. The trailer and lead-in (both about 1 second) ensure that the full unit of speech is captured. All of these calculations are performed by the CPU 47 within the CAT system 13.

More specifically, the average value in step (1) above may be calculated by the following equation:

$$\text{AVERAGE} = ((n-1)/n) * N_{avg} + (1/n) * N_n$$

where: n=sample number;
$N_{avg}$=current average noise level; and
$N_n$=noise level associated with sample n If, for example, the threshold value of step (2) above is selected as one quarter (¼) of the average noise level during questions and answers, the equation becomes:

$$\text{THRESHOLD} = ((n-1)/n) * N_{avg} + (0.25/n) * N_n$$

By this equation, the threshold noise level is continuously updated during the proceeding to compensate for speakers of various voice levels.

Next, to accomplish step (3) above, average noise levels during a window of time before each court reporter's transition marker must first be calculated. If, for example, the sampling rate is 10 Hz and averaging is desired at every half second interval, the average for each interval may be computed by simply dividing the noise level associated with each sample during the half second interval (5 samples) by 5 and then adding them together. Although only a 10 Hz sampling is used, higher sampling rates with further averaging might be used to increase the accuracy of detection of dead zone edges. Moreover, even though the sampling rate might increase to rates sufficient to accommodate sound reproduction, the majority of these samples might be skipped when performing dead zone identification. For example, only one (1) actual sample might be considered out of every eight hundred (800) incoming so as to simulate a 10 Hz sampling rate for dead zone calculations.

The duration of the time window must next be selected, and may vary depending on the efficiency of the court reporter. If a court reporter has traditionally experienced a longer stroking delay, a longer time window may be chosen. The time window provides a time period during which the CAT system 13 may search for a dead zone. By confining the area of dead zone searching, incorrect identification of pauses between words or sentences in a single unit of speech as being dead zones can be avoided. The time window is adjusted to a time period slightly larger than the default offset described above with regard to FIG. 3. For illustrative purposes, a three second time window is chosen here.

Beginning at the court reporter's transition marker for a new unit of speech, by checking the calculated average noise level against the threshold value over a 1½ second interval, a dead zone is determined to exist. Upon detecting a dead zone, the CAT system 13 subtracts a one second lead-in time from the ending edge of the dead zone, and associates the results with the programming object corresponding to the new unit of speech. The results constitute the beginning of the new unit of speech.

Once a dead zone has been detected, the three second window is ignored, and the CAT system 13 begins to further trace back until a beginning of the dead zone is identified. The court reporter's transition marker for the previous unit of speech sets an absolute barrier beyond which tracing back will not occur. If, prior to reaching the absolute barrier, the average noise level rises above the threshold value, the beginning edge of a dead zone is detected. The CAT system 13 adds a one second trailer time from the beginning edge of the dead zone and then associates the results with the programming object corresponding to the previous unit of speech. The results constitute the end of the previous unit of speech.

If the absolute barrier is reached before identifying the beginning of a dead zone, the CAT system 13 first indicates to the court reporter that two units of speech by the same speaker have been indicated. If the absolute barrier is reached twice in a row, the CAT system 13 determines that there is a system problem and warns the court reporter of this status.

If, however, no dead zone is detected during the three second window, the CAT system 13 subtracts the default offset (FIG. 3) from the reporter's transition marker, and associates the results with the programming object of the new unit of speech as the beginning thereof. The CAT system 13 also associates the court reporter's transition marker plus a trailer time (1 second) with the programming object corresponding to the previous unit of speech. The results constitute the end of the previous unit of speech.

It is also contemplated that dead zone identification may occur during the sampling process. For example, the beginning of a potential dead zone could be detected, followed by a potential end. Only if the end of the potential dead zone occurs during the three second window would the CAT system 13 conclude that the sound gap actually constitutes a gap between speakers. The advantages of this approach would be to instantly provide synchronization information upon detecting a court reporter's transition marker. The disadvantages include the additional calculation overhead resulting from analysis outside of the three second window.

While three seconds may be chosen as an initial value for the time window, the CAT system 13 may keep track of the court reporter's average delay time and adjust the value accordingly. For example, if no more than two seconds is ever required to detect a transition (i.e., the trailing edge of a dead zone) then the time window may be reduced to two seconds.

Figure 5:
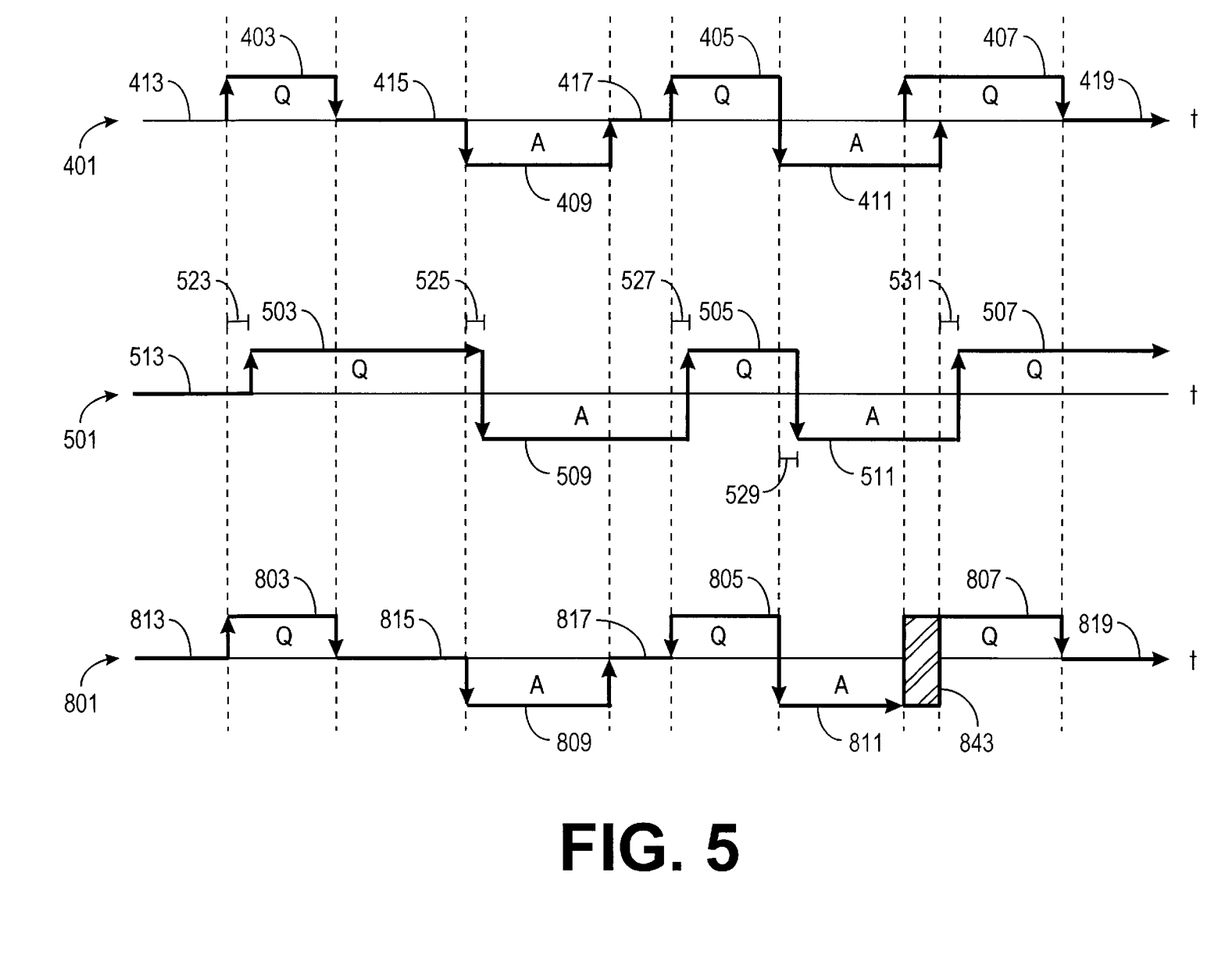

FIG. 5 is a timing diagram of the differential signal synchronization scheme of the present invention. The time lines 401 and 501 are identical to that found and described above in regards to FIG. 3. Their duplication provides time referencing for the differential signal timing of a time line 801.

The time line 801 illustrates a synchronization scheme in which separate microphones and recording channels are used, one for the attorney and another for the witness, to provide differentiation between question and answer units of speech. For example, when the attorney asks a question 403, the CAT system 13 detects that the attorney's microphone produces a larger audio signal than the witness's microphone. Similarly, when the witness answers, the CAT system 13 detects that the witness's microphone produces the largest audio signal. When neither party talks, the CAT system 13 detects that amplitude of both microphones being very low and categorizes the region as a dead zone. During periods of overlap, the CAT system 13 detects high amplitudes on both microphones and categorizes the period appropriately.

In particular, the time line 801 illustrates an exemplary categorization made by the CAT system 13 using the differential analysis of the two microphones. As can be seen, exact synchronization can be achieved for ordinary situations such as the question 403, answer 409 and questions 405 interchange which correspond directly to differential signals 803, 809 and 805. Furthermore, during periods such as the period 843, the differentiation scheme also provides for identification of the beginning and ending of units of speech which overlap.

Referring back to FIG. 2, the two microphones 201 and 202 are positioned at trial as follows: one at the podium or attached to the attorney, and another at the witness stand. In a deposition, the microphones 201 and 202 would be placed directly in front of the attorney and the witness. Each of the microphones 201 and 202 records on a separate channel. The audio board 51, via communication link 509, receives the analog audio signals on each channel and digitizes it (i.e., through sampling as discussed above). After sampling, the digital audio data on each channel is stored in the database 360.

Thereafter, the CAT system 13 performs differential amplitude calculations upon receiving each transition marker so as to provide for more accurate synchronization of the audio and video transcripts with the textual transcript. As with the dead zone calculations, it is not necessary that the CAT system 13 consider all of the data samples on each channel to adequately perform these calculations. Instead, the CAT system 13 may only consider a sample every tenth of a second (10 Hz), for example.

In essence, using the samples, the CAT system 13 looks for amplitude transitions from one channel to the other to determine when an actual transition occurs. Specifically, when the CAT system 13 receives a transition marker from the court reporter terminal 11, the CAT system 13 traces back until it finds a beginning transition of the new unit of speech. Thereafter, the CAT system 13 continues tracing back until the ending transition of the previous unit of speech is identified. For the tracing back, the previous transition marker is the absolute barrier for both the beginning and ending transition identifications. In addition, trailer and lead-in times are appropriately added as described above in relation to dead zone synchronization.

If, while tracing back, the CAT system 13 does not encounter a second transition before it reaches the absolute barrier, it uses the transition marker (i.e. the one from which it was originally tracing) as a default setting for the end of the previous unit of speech. Although this situation could occur during periods of speaker overlap, the CAT system 13 generally prevents such occurrences by evaluating the amplitude levels of the signals on both channels. If questionable periods of overlap seem at issue, the CAT system 13 responds by using the default offset procedure described in relation to FIG. 3.

The CAT system 13 identifies actual transitions by first subtracting the signals to determine which one predominates, is greater. The average difference is then compared to a threshold value to determine whether the average difference is great enough to constitute a voice signal on the predominant channel. A transition occurs when a new channel predominates and the resulting signal on the new predominating channel is above the threshold value. The average difference and threshold value are calculated in a manner similar to that discussed above with regard to the dead zone synchronization scheme.

It should be understood that the dead zone and differential signal synchronization schemes can be used together to further ensure accurate synchronization of the audio and video transcripts with the textual transcript. In addition, whether one or both embodiments are used, a court reporter may still, after the proceeding, manually review the tape and set new markers, if necessary.

Figure 6:
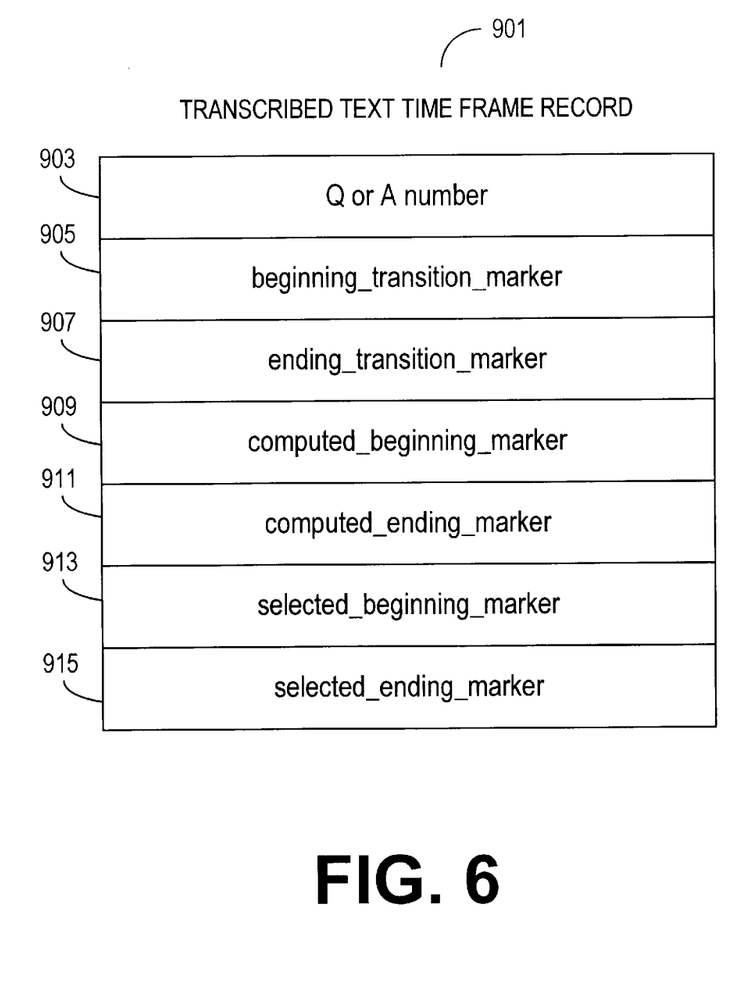
FIG. 6 is a diagram of the fundamental record of the data structure used in the present invention providing storage and access to the synchronization information according to the present invention.

FIG. 6 illustrates the programming object used to store all of the synchronization information described heretofore regarding a single unit of speech. In particular, the CAT system 13 utilizes a transcribed text time frame (TTTF) record 901, a programming object, to associate a variety of synchronization information. Although other types of objects and additional fields are contemplated, the TTTF record 911 provides the preferred synchronization storage structure for the present invention.

Basically, the CAT system 13 uses record 901 to associate the transcribed text of each individual question and answer units of speech with the corresponding audio and video. Particularly, the TTTF record 901 associates: (1) a unit of speech field 903 for storing an identifier for identifying the specific textual counterpart to a specific unit of speech, such as whether the text is a question or answer and the associated question or answer number; (2) a beginning transition marker field 905 for storing a frame or sample number associated with the court reporter's first transition marker; (3) an ending transition marker field 907 for storing a frame or sample number associated with the court reporter's subsequent transition marker; (4) a computed beginning marker field 909 for storing a frame or sample number associated with the beginning of the unit of speech as computed by the CAT system 13; (5) a computed ending marker field 911 for storing a frame or sample number associated with the end of the unit of speech as computed by the CAT system 13; (6) a selected beginning marker field 913 for storing a sample or frame number associated with the beginning of the unit of speech as manually selected by the court reporter after the proceeding; and (7) a selected ending marker field 915 for storing a sample or frame number associated with the end of the unit of speech as manually set by the court reporter after the proceeding.

The illustrated TTTF record 901 provides for association of the textual transcript with a combined audio and video transcript. To accommodate independent audio and video transcripts, the fields 905 through 915 are merely duplicated, with the duplicate fields being assigned to the video information and the original fields being assigned to the audio. In either configuration, a single TTTF record 901 is used for each unit of speech transcribed during the proceeding.

Using position synchronization for locating and playing audio and video also proves to be a valuable tool for the attorney. If the attorney desires to play portions of the audio or the video, for example, during trial, the attorney may use the lexical searching capabilities of the attorney terminals to locate the desired Q & A's, and may then automatically play the associated audio or video back for the judge and jury.

Figure 7:
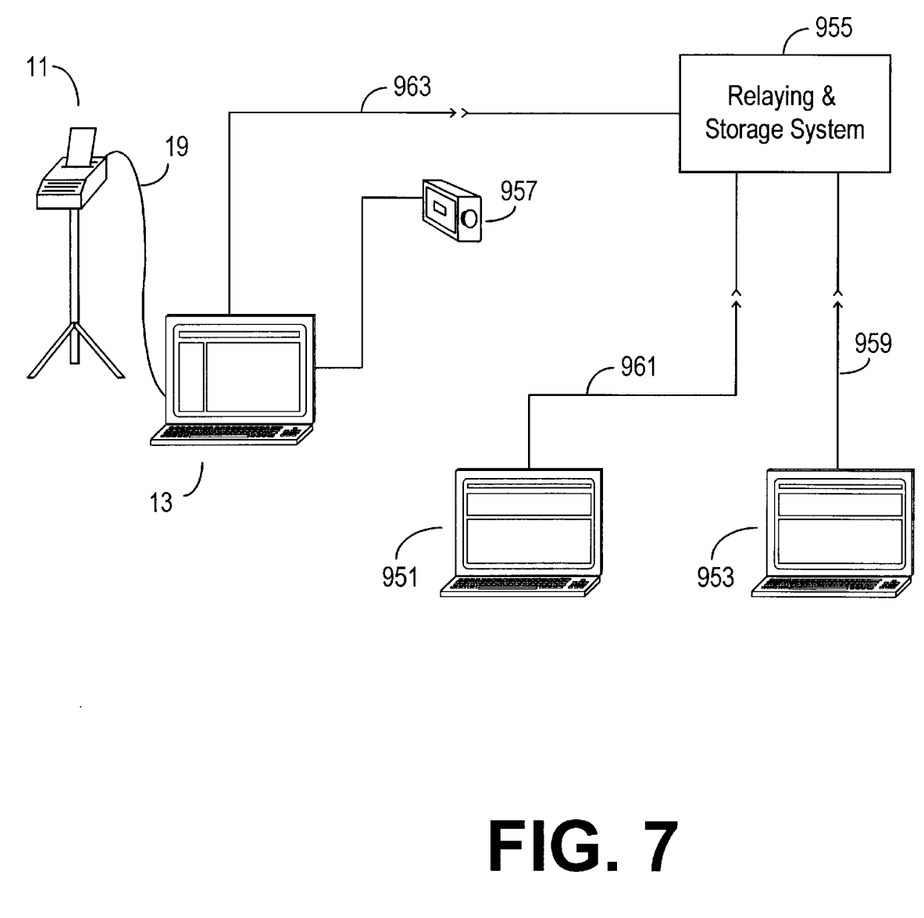
FIG. 7 is a perspective view of an alternate embodiment of the present invention not only providing for review and analysis of synchronized audio, video and textual transcripts, but also providing video on demand via a remote relaying and storage system.

FIG. 7 is a perspective view of an alternate embodiment of the present invention not only providing for review and analysis of synchronized audio, video and textual transcripts, but also providing real-time audio and video on demand via a remote relaying and storage system 955. The CAT system 13 receives audio and video signals from the video recorder 957, processes and transmits them to the remote relaying and storage system 955. Synchronization information and the textual record are also transmitted.

The first function of the system 955 is to provide repeater functionality wherein the incoming signal is relayed to any number of selected communication ports providing access to remote terminals. In this way, the remote terminals, such as remote terminals 951 and 953, may receive virtual real-time video and audio on demand. In addition, the system 955 performs storage and play-back of the video and audio transcripts along with the textual transcript and synchronization information so that the transcript can be selectively parsed and reviewed during and after the proceeding.

To store the video transcript, the system 955 first converts the incoming video signals into any one of a number of established bit-parallel digital interface formats for component video. The CCIR recommendation 601, the SMPTE RP 125, and the SMPTE 240M-1988 standards are exemplary formats which may be adopted. For example, to achieve the CCIR recommendation 601 standard, the CAT system 13 divides the video signal into three components, a luminance signal (Y) and two color difference signals (R-Y, B-Y). The luminance component is sampled into the digital domain at 13.5 MHz and the color difference components are sampled at 6.75 MHz each. One byte of color difference is transmitted (byte serial over eight differential conductor pairs with a ninth pair carrying a clock signal of 27 MHz) followed by a luminance byte which is then followed by the second color difference component. The net result is a 27 Mbytes/second digital data stream that can pass through hundreds of meters of cables and through many stages of processing without degradation.

To capture and play-back the video, the storage system 955 incorporates a series of storage disks arranged in parallel. This might be accomplished by combining several heads in a single large disk or by combining several small disks (often referred to as RAID architecture). However, preferably, the system 955 incorporates real time disks grouped in a modular fashion. For example, two subsystems of six disks combined to transfer at a sustained rate of 26.8 Mbytes/second will support the CCIR 601 standard. Recognition Concepts, Inc., manufactures a DataSTORE® Real Time Disk series for such purposes.

A variety of input devices, including video camera 951 might also be converted to the CCIR standard. Encoders and decoders are available to allow inputs and outputs from PAL, NTSC, RGB, YUV, and CCIR 601, permitting many different formats to be conveniently reformatted into a single standard digital path for temporary or permanent storage onto magnetic disk or tape.

In addition, the storage system 955 may act as a "warehouse" for storage of the audio, video and textual transcripts for post-proceeding review. Individuals may, via remote terminals such as the terminals 951 and 953, access any prior stored data. Because the system 955 also provides storage for the synchronization information as mentioned above, the video and audio transcript can be fully synchronized with the corresponding textual record.

It is obvious that the embodiments of the present invention described hereinabove are merely illustrative and that other modifications and adaptations may be made without departing from the scope of the appended claims.

We claim:

1. A method utilized during a testimonial proceeding involving an attorney for facilitating the use of information from the testimonial proceeding, the method using a transcription system and a capture system, the method comprising:

converting, using the transcription system, spoken words to text in real time;

capturing, using the capture system, video images showing speaking of the spoken words in real time;

associating the video images with the text;

displaying the text for real time review by the attorney;

while converting the spoken words to the text, accepting an input from the attorney and performing a search of the text using the accepted input; and displaying portions of the video images corresponding to portions of the text located in response to the search.

2. The method of claim 1 further comprising reassociating the video images with the text to attempt to provide accurate synchronization therebetween.

3. The method of claim 1 wherein the displaying of portions of the video images enables review by a judge.

4. The method of claim 1 wherein the displaying of portions of the video images enables review by a jury.

5. The method of claim 1 using an attorney terminal and further comprising delivering at least the portions of the video images to the attorney terminal.

6. The method of claim 5 wherein displaying of portions of the video images occurs on the attorney terminal.

7. The method of claim 1 further comprising:

capturing, using the capture system, audio signals representative of the spoken words in real time;

associating the audio signals with the text; and reproducing portions of the spoken words from portions of the audio signals corresponding to portions of the text located in response to the search.

8. The method of claim 7 further comprising reassociating the audio signals with the text to attempt to provide accurate synchronization therebetween.

9. The method of claim 7 wherein the reproduced portions of the spoken words being reproduced for review by a judge.

10. The method of claim 7 wherein the reproduced portions of the spoken words being reproduced for review by a jury.

11. The method of claim 7 using an attorney terminal and further comprising delivering at least the portions of the audio signals to the attorney terminal.

12. The method of claim 11 wherein reproduction of the portions of the spoken words occurs on the attorney terminal.

13. The method of claim 7 wherein the transcription system comprises a stenographic system.

14. The method of claim 13 further comprising converting the spoken words to a textual form utilizing a speech recognition system, and wherein the stenographic system and the speech recognition system coordinate the step of converting.

15. The method of claim 7 wherein the capture system comprises a video camera.

16. The method of claim 1 wherein the capture system comprises a video camera.

17. A method for facilitating the use of information from a testimonial proceeding, the method utilized at least in part during the testimonial proceeding, the method using a transcription system, a capture system and a terminal having a screen, the method comprising:

converting, using the transcription system, spoken words to text in real time;

capturing, using the capture system, video images showing speaking of the spoken words in real time;

associating the video images with the text;

storing the text and the associated video images;

displaying the text on the screen for real time review;

accepting an input and performing a search of the stored text using the accepted input; and displaying portions of the stored video images corresponding to portions of the stored text located in response to the search.

18. The method of claim 17 further comprising reassociating the video images with the text to attempt to provide accurate synchronization therebetween.

19. The method of claim 17 wherein the capture system comprises a video camera.

20. The method of claim 17 further comprising:

capturing, using the capture system, audio signals representative of the spoken words in real time;

associating the audio signals with the text;

storing the text and the associated audio signals; and reproducing portions of the spoken words from portions of the stored audio signals corresponding to portions of the stored text located in response to the search.

21. The method of claim 20 further comprising reassociating the audio signals with the text to attempt to provide accurate synchronization therebetween.

22. The method of claim 20 wherein the transcription system comprises a stenographic system.

23. The method of claim 22 further comprising converting the spoken words to a textual form utilizing a speech recognition system, and wherein the stenographic system and the speech recognition system coordinate the step of converting.

24. The method of claim 20 wherein the capture system comprises a video camera.

25. The method of claim 20 wherein the capture system includes a tape recorder.

26. A method for facilitating the use of information from a testimonial proceeding, the method utilized at least in part during the testimonial proceeding, the method using a transcription system, a capture system and a terminal having a screen, the method comprising:

converting, using the transcription system, spoken words to text in real time;

capturing, using the capture system, video images showing speaking of the spoken words in real time;

associating the video images with the text;

delivering the text to the terminal; and displaying the text on the screen for real time review.

27. The method of claim 26 further comprising:

delivering at least portions of the video images to the terminal; and displaying at least portions of the video images delivered.

28. The method of claim 27 wherein the displaying of the at least portions of the video images delivered occurs on the screen along with the displaying of the text.

29. The method of claim 28 wherein the displaying of the at least portions of the video images and the displaying of the text supports real time review.

30. The method of claim 26 further comprising delivering the video images to the terminal.

31. The method of claim 30 further comprising displaying the video images delivered.

32. The method of claim 26 further comprising:

storing the text and the associated video images;

accepting an input and performing a search of the stored text using the accepted input; and displaying portions of the stored video images corresponding to portions of the stored text located in response to the search.

33. The method of claim 26 further comprising capturing, using the capture system, audio signals representative of the spoken words in real time; and associating the audio signals with the text.

34. The method of claim 33 further comprising:

delivering at least portions of the audio signals to the terminal; and reproducing at least portions of the spoken words from the at least portions of the audio signals delivered.

35. The method of claim 33 further comprising delivering the audio signals to the terminal.

36. The method of claim 35 further comprising reproducing the spoken words from the audio signals delivered.

37. The method of claim 33 further comprising:

storing the text and the associated audio signals;

accepting an input and performing a search of the stored text using the accepted input; and reproducing portions of the spoken words from portions of the stored audio signals corresponding to portions of the stored text located in response to the search.

38. A method for facilitating the use of information from a testimonial proceeding, the method utilized at least in part during the testimonial proceeding, the method using a transcription system, a capture system and a remote terminal having a screen, the method comprising:

converting, using the transcription system, spoken words to text in real time;

capturing, using the capture system, video images showing speaking of the spoken words in real time;

storing the text and the video images;

communicating at least portions of the text and at least portions of the video images to the remote terminal; and displaying at the remote terminal the communicated text and the communicated video images on the screen for real time review.

39. The method of claim 38 further comprising accepting, at the remote terminal, an input and performing a search of the stored text using the accepted input.

* * * * *